F. MATOUSHEK.
NUT LOCK.
APPLICATION FILED MAY 15, 1908.

904,548.  Patented Nov. 24, 1908.

Inventor
Frank Matoushek

Witnesses

By

Attorneys

UNITED STATES PATENT OFFICE.

FRANK MATOUSHEK, OF GREGORY, SOUTH DAKOTA.

NUT-LOCK.

No. 904,548.     Specification of Letters Patent.     Patented Nov. 24, 1908.

Application filed May 15, 1908. Serial No. 433,056.

*To all whom it may concern:*

Be it known that I, FRANK MATOUSHEK, citizen of the United States, residing at Gregory, in the county of Gregory and State of South Dakota, have invented certain new and useful Improvements in Nut-Locks, of which the following is a specification.

This invention contemplates certain new and useful improvements in nut locks, and the object of the invention is an improved washer which may be readily applied to the ordinary bolts and nuts to effectually retain the latter in position upon the former, against any accidental loosening movement, and which may be readily operated to release the nuts, when it is desired to remove the same.

With this and other objects in view that will more fully appear as the description proceeds, the invention consists in certain constructions and arrangements of the parts that I shall hereinafter fully describe, and then point out the novel features thereof, in the appended claims.

Figure 1:
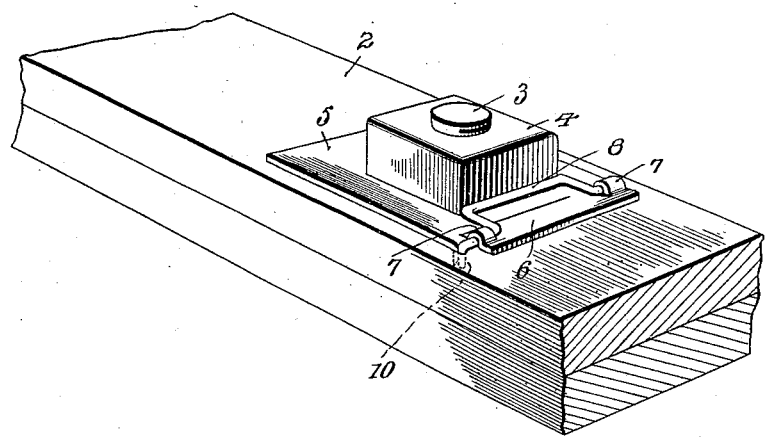
Figure 2:
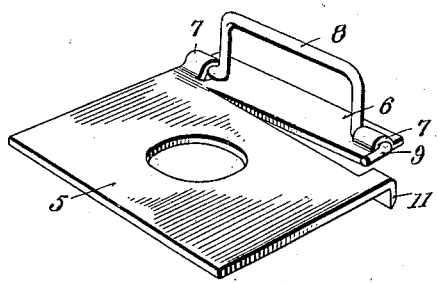
Figure 3:
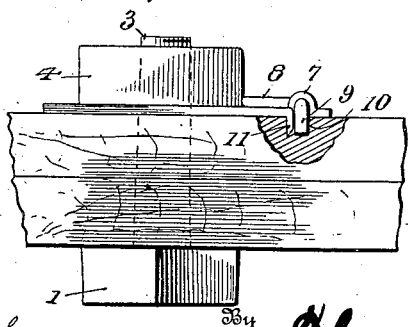

For a full understanding of the invention and the merits thereof, and to acquire a knowledge of the details of construction, reference is to be had to the following description and accompanying drawing, in which:

Figure 1 is a perspective view of my improved nut lock, showing it applied; Fig. 2 is a similar view of the washer, and, Fig. 3 is a view in elevation with parts in section.

Corresponding and like parts are referred to in the following description, and indicated in all the views of the drawing, by the same reference characters.

Referring to the drawing, the numeral 1 designates a bolt which is applied to the work 2 in the ordinary manner, with the threaded extremity of its shank 3 projecting outwardly therefrom, and being retained in position by a nut 4 working on said shank and screwed up against the work. A washer 5 is interposed between the nut and the work 2, and may be of any suitable shape, but is preferably square, said washer being slit substantially parallel to one side edge, to form a marginal spring tongue 6, the free end of which normally bears against the work and terminates in spaced relation to the adjacent side edge of the washer. This spring tongue is formed at opposite edges with outwardly disposed alining ears 7, in which is journaled a crank shaft 8, the crank portion of which is arranged to be swung over against the outer face of the washer and to abut against the periphery of the nut 4, to prevent any rotation thereof relative to the washer. The end of the shaft adjacent to the free end of the spring tongue is angularly disposed in a plane perpendicular to the plane defined by the crank portion of the shaft, and is normally held by said spring tongue in an outwardly opening socket 10 formed in the work, whereby to hold the crank portion of the shaft against the periphery of the nut, and to anchor the washer to the work, and thus securely hold the nut in position upon the bolt. The washer 5 is formed between the free end of the spring tongue and the adjacent side edge, with a lug 11 which abuts against the angularly disposed end of the shaft, to brace the same and form a stop to prevent the accidental rotation of said shaft, one corner of said lug being disposed inwardly and constituting a tooth that is engaged with the work, to prevent any rotation of the washer when the nut is being screwed into position.

When it is desired to disengage the nut from the bolt, the free end of the tongue 6 is sprung outwardly from the work, so as to disengage the angularly disposed end 9 of the shaft from the socket 10, and permit said shaft to be rotated, to swing the crank portion thereof away from the periphery of the nut, whereby to release the same and permit the nut to be disengaged from the bolt in the customary manner. The reversal of the above operation obviously returns the parts of the nut lock to an operative position.

From the above description, in connection with the accompanying drawing, it will be apparent that I have provided a simple, durable and efficient construction of nut lock which may be applied to the ordinary form of bolts and nuts, without any changes therein, which effectually retains the nut in position upon the bolt, and may be operated to quickly release the nut, when such is desired, without injury to the operative parts of the device, and which consists of comparatively few parts that may be easily and cheaply manufactured and readily assembled.

Having thus described the invention, what I claim is:

1. As a new article of manufacture, a locking washer formed with a tongue that is normally spring-pressed against the work, and a crank shaft journaled on the tongue and having one end angularly disposed and adapted to be held by said tongue in engagement with a socket in the work.

2. As a new article of manufacture, a locking washer formed with a tongue, a crank shaft journaled on the tongue and having one end angularly disposed and adapted to engage with a socket in the work, and means carried by said washer for preventing the rotation of the same relative to the work.

3. As a new article of manufacture, a locking washer formed with a spring tongue and a crank shaft journaled thereon and having one end angularly disposed and adapted to engage with a socket in the work, said washer being formed with a tooth arranged to be embedded in the work, as and for the purpose specified.

4. As a new article of manufacture, a locking washer, slit to form a marginal spring tongue, the free end of which terminates within the periphery of the washer, said spring tongue being formed with alining ears, and having its end adjacent to the free end of the spring tongue angularly disposed in a plane perpendicular to the plane defined by the crank portion, said washer being formed adjacent to the free end of the spring tongue with a lug arranged to abut against the angularly disposed end of the shaft, and having one corner inwardly disposed to form a tooth.

In testimony whereof I affix my signature in presence of two witnesses.

FRANK MATOUSHEK. [L. S.]

Witnesses:
J. A. FLYNN,
E. M. HOOD.